Dec. 17, 1968  R. G. LE TOURNEAU  3,417,304
CONTROL SYSTEM FOR ELECTRICALLY POWERED VEHICLES
Filed Sept. 21, 1965  2 Sheets-Sheet 2
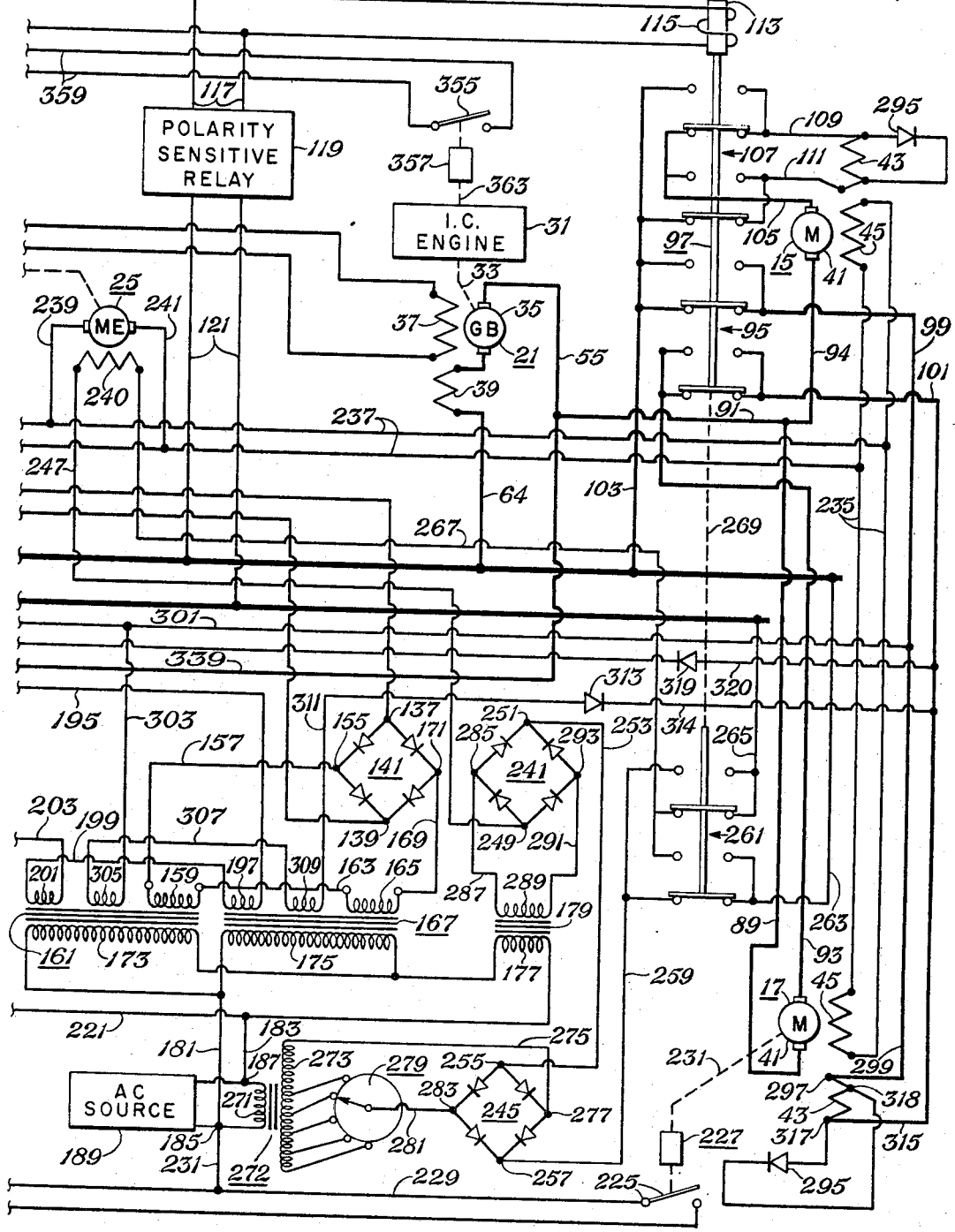
FIG. IA
INVENTOR
Robert G. LeTourneau
BY
Wm. T. Wofford
ATTORNEY

United States Patent Office 3,417,304
Patented Dec. 17, 1968

3,417,304
CONTROL SYSTEM FOR ELECTRICALLY POWERED VEHICLES
Robert G. LeTourneau, P.O. Box 2307,
Longview, Tex. 75601
Filed Sept. 21, 1965, Ser. No. 488,981
15 Claims. (Cl. 318—149)

ABSTRACT OF THE DISCLOSURE

Electrically powered self-propelled heavy duty type work vehicles wherein vehicle wheels are driven by electric motors which are supplied power from 1 or more generators which in turn are powered by 1 or more internal combustion engines. Arrangements provide improved performance under the dynamic braking condition. Where 2 or more generators are used, they are automatically paralleled in driving condition and separated under dynamic braking condition. Various vehicle load conditions are sensed and dynamic braking automatically applied accordingly to meet optimum braking requirements and also to prevent vehicle overspeed.

---

Figure 1:
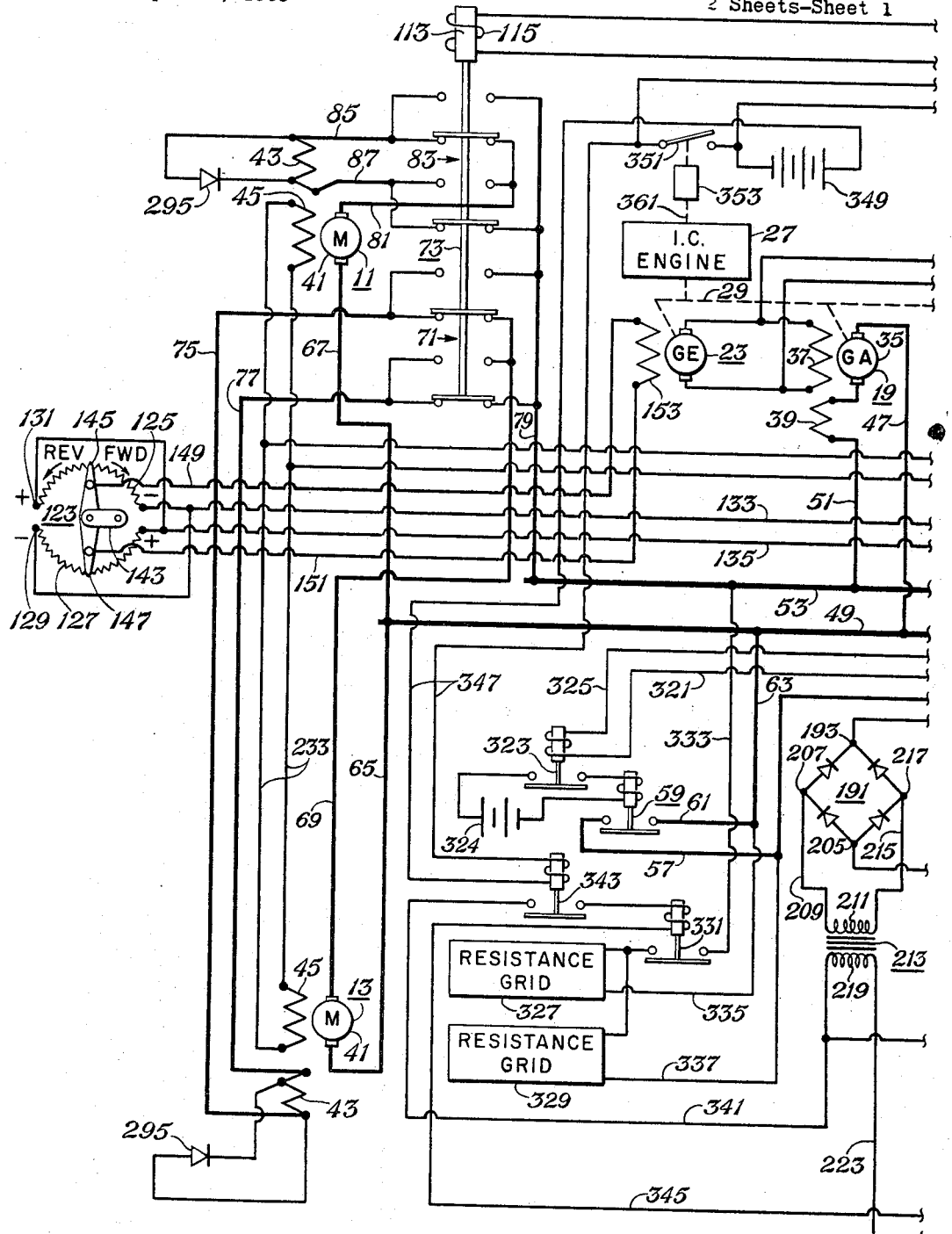

The present invention relates to control systems for electrically powered vehicles, and more particularly to systems, apparatus and arrangements for controlling vehicles wherein the vehicle wheels are driven by electric motors which are supplied power from one or more generators, which in turn are powered by one or more internal combustion engines.

Many types of control systems have been devised in the prior art of which I am aware, for various applications involving vehicles driven by electric traction motors supplied from internal combustion engine driven generators, a notable example being diesel-electric trains. However, the particular type of application with which my invention is primarily concerned, though quite old in general concept, is really quite new insofar as actual practice is concerned. This general concept is that of the heavy duty type self-propelled rubber tired off-road vehicle and/or mobile self-propelled work performing machine. Machines of this general class include by way of example off-road transport vehicles, earthmoving and earthworking machines, such as scrapers, dozers, tractors and haulers, land clearing machines, logging machines, mobile cranes, and the like. It is only recently that such machines have been electrically powered to a practical commercial extent; that is, having an internal combustion engine or engines driving a generator or generators to supply electrical power to vehicle wheel motors as well as to the other functions of the machine. The requirements for the electrical systems of such machines are quite severe. The electrical system of such machines must cope with wheel motor load and speed changes that are quite rapid and extend over a wide range. Further, it is very important that such machines have an effective dynamic braking system, since the braking demands are much too severe for friction brakes alone.

My U.S. Patent No. 3,102,219 discloses control systems for electrically powered vehicles of the type hereinabove referred to. The present invention is concerned with improvements to such control systems, particularly as to performance under dynamic braking conditions, and including systems wherein the vehicle wheel motors may receive their power from a plurality of generators.

Accordingly, the general object of the present invention is to provide improved control apparatus, systems, and arrangements for vehicles of the general class above-mentioned.

More specifically, it is an object of the present invention to provide control apparatus, systems, and arrangements which will result in improved performance under dynamic braking conditions, for vehicles of the general class above-mentioned.

Another object of the present invention is to provide improved running to dynamic braking and vice versa control arrangements for vehicles of the general class above-mentioned.

Another object of the present invention is to provide improved control apparatus, systems, and arrangements to prevent over-speeding of the internal combustion engine or engines which drive the generator or generators of vehicles of the general class above-mentioned.

Another object of the present invention is to provide improved control apparatus, systems, and arrangements for vehicles of the general class above-mentioned, wherein the likelihood of wheel motor flashing under dynamic braking conditions will be minimized.

These and other objects are effected by this invention, as will be apparent from the following description taken in accordance with the accompanying drawings, forming a part of this application, in which:

The single figure is a schematic circuit diagram showing apparatus, control systems and arrangements in accordance with a preferred embodiment of the invention.

Referring now to the drawings, there are shown four direct current traction motors 11, 13, 15, 17. These motors are incorporated into self-contained vehicle wheel drive units. Such wheel drive units include a gear reduction built into the wheel structure, with the traction motor driving the gear reduction. The wheel drive units are then mounted to the vehicle axles. For details of such wheel drive units (sometime referred to as "electric wheels") reference is made to my U.S. Patent No. 2,726,726. For purposes of discussion herein, the vehicle will be assumed to have four wheels, each of which is an "electric wheel." It should be understood, however, that the present invention is applicable also to vehicles having either less than or more than four "electric wheels."

Also shown in the drawings are two direct current generators 19, 21. The generator 19 will hereinafter be referred to as generator A, and the generator 21 will hereinafter be referred to as generator B. Also shown in the drawings are a generator exciter 23, and a motor exciter 25, which are driven, along with generator A, via conventional mechanical linkages indicated by the dotted lines 29, by an internal combustion engine (shown as a block 27, and which will hereinafter be called internal combustion engine A). Generator B is driven by a second internal combustion engine (shown as a block 31, and which will hereinafter be called internal combustion engine B) via a conventional mechanical linkage indicated by the dotted line 33. While two generators and engines are shown, the present invention is also applicable in cases where more than two engine-generator sets are used, and in some of its aspects, to cases where only one engine-generator set is used. The generators 19, 21 are preferably of the differential compound type, each having an armature 35, a shunt field winding 37, and a series field winding 39, and output terminals. If desired, shunt generators could be used. Each direct current traction motor is preferably of the cumulative compound type, having an armature 41, a series field winding 43, and a shunt field winding 45 and input terminals.

One side of the armature 35 of generator A is connected via lead 47 to a first main line bus 49, while the other side of the armature 35 of generator A is connected in series with the generator series field winding 39 and via lead 51 to a second main line bus 53. One side of the armature 35 of generator B is connected via leads 55, 57 in series with the normally open contacts of a first relay 59 and via leads 61, 63 to the first main line bus 49. The other side of the armature 35 of generator B is connected in series with the generator series field winding and via lead 64 to the second main line bus 53.

The left front wheel motor 13 has one side of its armature 41 connected via lead 65 to the first main line bus 49, and the right front wheel motor 11 has a corresponding side of its armature 41 connected via lead 67 to the first main line bus 49. The left front wheel motor 13 has the other side of its armature 41 connected via lead 69 to a first set of contacts 71 of a first reversing relay 73, via lead 75, in series with the motor series field winding 43, and via leads 77, 79 to the second main line bus 53. The right front wheel motor 11 has the other side of its armature 41 connected via lead 81 to a second set of contacts 83 of the first reversing relay 73, via lead 85 in series with the motor series winding 43, and via leads 87, 79 to the second main line bus 53.

The left rear wheel motor 17 has one side of its armature 41 connected via leads 89, 91 to the side of the armature 35 of generator B that is connected, when the contacts of the first relay 59 are closed, to the first main line bus 49, and the right rear wheel motor 15 has a corresponding side of its armature 41 connected via leads 94, 91 to the same side of the armature of generator B. The other side of the armature 41 of the left rear wheel motor 17 is connected via lead 93 to a first set of reversing contacts 95 of a second reversing relay 97, via lead 99, in series with the motor series field winding 43, and via leads 101, 103, the second main line bus 53, and lead 64, to the other side of generator B. The right rear wheel motor 15 has the other side of its armature 41 connected via lead 105 to a second set of contacts 107 of the second reversing relay 97, via lead 109 in series with the motor series winding 43, and via leads 111, 103, and the second main line bus 53, and lead 64, to the other side of generator B. In brief, the front wheel motors 11, 13 are connected in parallel across the output terminals of generator A, while the rear wheel motors 15, 17 are connected in parallel across the output terminals of generator B and, when the contacts of the first relay 59 are closed, the rear wheel motors are also connected in parallel with the front wheel motors. Further, the series field windings 43 of all of the wheel motors are arranged to be reversed by action of the respective first and second reversing relays 73, 97.

Each of the first and second reversing relays 73, 97 has a respective armature 113, which is mechanically linked to the respective contact sets 71, 83, 95, 107. Each contact set is in effect a double pole double throw reversing switch, with the respective series field winding 43 connected across the center poles. Each reversing relay armature 113 has a respective operating coil 115. The operating coils 115 are connected in parallel and via leads 117 to the output terminals of a polarity sensitive relay (shown as a block 119), the input terminals of which are connected via lead 121 across the main line buses 49, 53.

The polarity sensitive relay 119 may be of any suitable type, the requisite characteristics and function of which will be hereinafter explained.

The sole controller for the vehicle is a potentiometer 123, which is arranged to have a voltage output which is continuously variable from 0 up to a predetermined magnitude, both positive and negative. The controller potentiometer 123 is made up of a first resistance segment 125 and an oppositely disposed second resistance segment 127. The first and second resistance segments 125, 127 are connected in reverse parallel fashion to a pair of input terminals 129, 131. The input terminals 129, 131 are also connected via leads 133, 135 to the respective output terminals 137, 139 of a first rectifier bridge 141. The controller potentiometer 123 has a control handle 143 which moves a pair of diametrically opposed slider contacts 145, 147 along the respective resistance segments 125, 127. The controller output voltage is taken from these slider contacts 145, 147 which are connected via leads 149, 151 in series with the shunt field winding 153 of the generator exciter 23.

The input circuit for the first rectifier bridge 141 may be traced from input terminal 155 via lead 157 in series with the third secondary winding 159 of a first saturable reactor 161 and via lead 163 in series with the third secondary winding 165 of a second saturable reactor 167 and via lead 169 to the other input terminal 171. Each saturable reactor 161, 167 has a single respective primary winding 173, 175, and these primary windings are connected in parallel with each other and in series with the primary winding 177 of a first transformer 179. This circuit may be traced from one output terminal 185 of a source of regulated alternating current voltage shown as a block 189, via lead 181 in series with the parallel combination of windings 173, 175 and in series with winding 177 and via lead 183 to the other output terminal 187 of the source 189. The source 189 may be an alternating current generator which is driven by one of the internal combustion engines 27, 31.

A second rectifier bridge 191 has an output circuit which may be traced from one output terminal 193 via lead 195 in series with the first secondary winding 197 of the second saturable reactor 167, and via lead 199 in series with the first secondary winding 201 of the first saturable reactor 161 and via lead 203 to the other rectifier bridge output terminal 205. The input circuit for the second rectifier bridge 191 may be traced from one input terminal 207 via lead 209 in series with the secondary winding 211 of a second transformer 213, and via lead 215 to the other input terminal 217. The primary winding 219 of the second transformer 213 is connected via leads 221 and 183 to output terminal 187 of the alternating current voltage source 189 and via lead 223 in series with the normally open contacts 225 of a motor over-speed relay 227 and via leads 229, 231 to output terminal 185 of the source 189. The over-speed relay 227 is connected via conventional mechanical linkages, as indicated by dotted line 231, to the output shaft of the left rear wheel motor 17. The over-speed relay 227 may be of any conventional type which is capable of closing a set of contacts whenever the motor shaft exceeds a predetermined rotational speed.

The motor shunt fields 45 are all connected in parallel via leads 233, 235, 237, and via leads 239, 241 across the armature output terminals of the motor exciter 25. The motor exciter 25 has a shunt field winding 240 which is controlled by a voltage that is the resultant of the series combination of the output voltage of a third rectifier bridge 241 and the output voltage of a fourth rectifier bridge 245 and the main line bus voltage. The circuit of the motor exciter shunt field winding 240 may be traced from one of its terminals via lead 247 to one output terminal 249 of the rectifier bridge 241 and from its other output terminal 251 via lead 253 to one output terminal 255 of the fourth rectifier bridge 245 and from its other output terminal 257 via lead 259 to a third set of contacts 261 of the second reversing relay 97, via lead 263 to the second main line bus 53, and from the first main line bus 49 via leads 265, 267 to the other terminal of the motor exciter shunt field winding 240. The third set of contacts 261 of the second reversing relay 97 are mechanically linked to its armature 113, as indicated by the dotted line 269.

The set of reversing relay contacts 261 amounts to a double pole double throw switch having its center poles connected respectively via leads 263, 265 across the main line buses 53, 49. The alternating current voltage source 189 has its output terminals 185, 187 connected to the primary winding of a third transformer 272 which has a tapped secondary winding 273. One end of the secondary winding 273 is connected via lead 275 to one input terminal 277 of the fourth rectifier bridge 245. The taps of the secondary winding 273 are connected to the input terminals of a tap switch 279, the selector control of which is connected via lead 281 to the other input terminal 283 of the fourth rectifier bridge 245. The third rectifier bridge 241 has one input terminal 285 connected via lead 287 in series with the secondary winding 289 of the first transformer 179 and via lead 291 to its other input terminal 293.

Each vehicle traction motor series field winding 43 has a rectifier 295 connected in shunt with a major portion of the winding turns. The rectifiers 295 are poled such that under normal vehicle drive conditions they are nonconductive so that current flows through all of the turns of the series field windings 43.

The series field winding 43 of one of the traction motors, for example the left rear traction motor 17, is utilized for some special purposes, as will be hereinafter more fully explained. In this connection, a circuit may be traced from a first end terminal 297 of series field winding 43 via leads 299, 301, 303 in series with the second secondary winding 305 of the first saturable reactor 161 and via lead 307 in series with the second secondary winding 309 of the second saturable reactor 167, and via lead 311 in series with rectifier 313 and via leads 314, 315 to a second end terminal 317 of the series field winding 43 and in series with rectifier 295 to an intermediate terminal 318 on the series field winding 43. The rectifier 313 is poled to conduct in the direction toward the second end terminal 317 of series field winding 43.

The first relay 59 is controlled from the series field winding 43 of the left rear traction motor 17. In this connection, a circuit may be traced from the second end terminal 317 of the series field winding 43 via lead 315 and lead 320 in series with rectifier 319 and via lead 321 in series with the energizing coil of a second or pilot relay 323 and via leads 325, 301, 299 to the first end terminal 297 of the series field winding 43. The rectifier 319 is poled to conduct in the direction away from the series field winding second end terminal 317. The second relay 323 has a set of normally open contacts which are connected in series with the energizing coil of the first relay 59 and an energizing source, shown as a battery 324.

A first and a second energy dissipating resistance grid, shown respectively as blocks 327, 329 are provided for purposes to be hereinafter explained. Both of the resistance grids 327, 329 have one of their terminals connected in series with the normally open contacts of a third relay 331 and via lead 333 to the second main line bus 53. The other terminal of the first resistance grid 327 is connected via leads 335, 63 to the first main line bus 49. The other terminal of the second resistance grid 29 is connected via leads 337, 339, 55 to the side of the armature 35 of generator B which is connected to the first main line bus 49 when the contacts of the first relay 59 are closed. The third relay 331 is energized from the alternating current voltage source 189. This circuit may be traced from one terminal 187 of the source 189 via leads 183, 221, and 341 in series with the normally open contacts of a fourth relay 343 and in series with the energizing coil of the third relay 331 and via leads 345, 231 to the other terminal 185 of the source 189. The energizing coil of the fourth relay 343 is connected via leads 347 in series with an energizing source shown as a battery 349 and the normally open contacts 351 of a first generator over-speed relay 353. The normally open contacts 35 of a second generator over-speed relay 357 are connected via leads 359 in parallel with the normally open contacts 351. The over-speed relay 353 is connected via mechanical linkages as indicated by the dotted line 361, to the output shaft of the internal combustion engine 27 which drives generator A. The over-speed relay 357 is connected via mechanical linkages, as indicated by the dotted line 363 to the output shaft of the internal combustion engine 31 which drives generator B. The over-speed relays 353, 357, like motor over-speed relay 227, may be any conventional type which is capable of closing a set of contacts whenever the respective generator or motor shaft exceeds a predetermined rotational speed.

Operation of the electrically powered vehicle control system in accordance with my invention will now be explained. The positions of the controls as shown by the drawings represent the condition wherein the vehicle is parked and ready for movement in the forward direction. The electric wheel motors of the vehicle are preferably provided with electromagnetic friction brakes (not shown) of a type which may be set or released by the vehicle operator as desired, and particularly for parking the vehicle.

Vehicle forward operation

Assuming that the internal combustion engines 27, 31 are running, and that it is desired to move the vehicle forward, it is only necessary to move the controller potentiometer 123 away from its neutral position (assume clockwise movement for forward vehicle motion). A direct current voltage of proper polarity and derived from the first rectifier bridge 141 will immediately be applied to the field 153 of the generator exciter 23, which in turn will cause the generator exciter to supply direct current voltage of proper polarity to the shunt fields 37 of generator A and generator B, whereupon the output voltage of generator A will appear across main line buses 49, 53, and the output voltage of generator B will be present at its armature output terminals. For convenience, it is assumed that the second main line bus 53 will be positive and the first main line bus 49 will be negative for vehicle forward motion. At this stage, the output voltage of generator A is applied to the armatures of the front wheel motors, and the output voltage of generator B is applied to the armatures of the rear wheel motors.

The wheel motor shunt fields 45, are supplied direct current voltage from the output of the motor exciter 25. The motor exciter shunt field 240 is controlled by a resultant direct current voltage which is the algebraic sum of three serially connected voltages, namely, the main line bus voltage supplied via the contacts 261 of the second reversing relay 97, the output voltage of the fourth rectifier bridge 245, and the output voltage of the third rectifier bridge 241. For additional details of the motor excitation control system, reference is made to my U.S. Patent No. 3,093,780. Under normal vehicle driving conditions, the rectifier bridge 241 performs the same function as rectifier bridge 245, that is, between them, they supply a direct current voltage which is always in bucking relation to the main line bus voltage.

Thus, with armature voltage and shunt field excitation applied to the wheel motors, the vehicle will move forward. As the vehicle wheel motors begin drawing load current, voltage will be developed across the series field winding 43 of the left rear wheel motor 17, which voltage is applied to the energizing coil of the second or pilot relay 323, which will then close its normally open contacts to energize the coil of first relay 59, which in turn will close its normally open contacts to complete the circuit to connect the output of generator B across the main line buses. Thus, in the normal vehicle drive condition, generator A and generator B have their outputs connected in parallel across the main line buses. In the normal vehicle drive condition, the balance of the operation of the electrical control system is the same as that described in my U.S. Patent No. 3,102,219. To stop the vehicle forward motion, it is only necessary to return the controller 123 to its neutral position.

*Vehicle reverse operation*

To move the vehicle in the reverse direction, it is only necessary to move the controller 123 counterclockwise away from its neutral position. This will cause voltage of opposite polarity to be applied to the generator exciter 23, which in turn will apply a voltage of opposite polarity to the shunt fields 37 of generator A and generator B, causing the output voltages of the generators to reverse their polarity. The vehicle can of course go to the reverse direction of operation from a standstill, but can also just as readily go from forward operation to reverse operation and vice versa. In other words, the controller 123 can be moved from a clockwise (forward) position through neutral and to a counterclockwise (reverse) position, or vice versa, and such action is a normal operation. The position of the motor reversing relays 73, 97 is determined by the polarity of the main line bus voltage. When the polarity of main line bus 53 is positive, the relays 73, 97 are in the position shown and the vehicle is set up for forward motion. When the polarity of main line bus 53 is negative, the relays 73, 97 are energized to the reverse position and the vehicle, of course, is then set up for reverse motion.

The device which controls the actuation of the motor reversing relays 73, 97 is the polarity sensitive relay 119. This polarity sensitive relay detects the polarity of the main line buses and actuates the motor reversing relays 73, 97 accordingly. The polarity sensitive relay 119 is designed to operate at very low levels of the input voltage. In other words, when there is a change of polarity of the main line bus voltage, the polarity sensitive relay will detect the polarity change and actuate the motor reversing relays while the main line bus voltage is at a very low level. This means, of course, that the motor reversing relay switching is done at very low current levels. Since devices which are capable of performing the function of the polarity sensitive relay 119 are well known to those skilled in the art, details of a polarity sensitive relay per se are not shown or described herein.

Assume now that the vehicle has been traveling in the forward direction and the controller 123 is moved counterclockwise through and beyond the neutral position. Immediately when the main line bus reverses polarity, the polarity sensitive relay 119 energizes the coils 115 of the motor reversing relays 73, 97 and the contacts of those relays are actuated to reverse position. This action, via contact sets 83, 71, 107, 95 reverses the series fields 43 of the respective wheel motors 11, 13, 15, 17. Also, via contact set 261, the input voltage from the main line buses which bucks the rectified alternating current voltage (from bridge rectifiers 241, 245) in the motor exciter field circuit is simultaneously reversed. Since both the polarity of the shunt fields 37 of generator A and generator B and the direction of current in the series field 39 of generator A and generator B have been reversed, the generators are still differential compound and act in exactly the same manner as for forward operation. Since the polarity of the motor shunt fields 45 has not changed, but the direction of motor armature current is reversed, and the motor series fields 43 have been reversed, the wheel motors are still cumulative compound and act in exactly the same manner as for forward operation.

*Vehicle dynamic braking operation*

One of the features of the present invention is the operation of the generators in parallel under the driving condition and separately under the dynamic braking condition. The vehicle wheel motor connections are arranged so that the load for each generator is divided as equally as possible under the dynamic braking condition. I have found that differential compound generators driving cumulative compound motors are very stable when paralleled. However, when each generator is driven by a separate and independent internal combustion engine, such paralleled generators are unstable under the dynamic braking condition. This is because one generator (operating then as a motor) will tend to take all of the total load. I provide simple and effective means for automatically connecting the generators in parallel under the drive condition and separately under the dynamic braking condition. As hereinbefore stated, the contacts of relay 59 are open when the vehicle is standing, and they are closed to complete the circuit to parallel generator B with generator A as the vehicle wheel motors begin to draw load current as they go to the drive condition. Specifically, the pilot relay 323 is energized by voltage derived from the series field winding of the left rear wheel motor 17 (it could, of course, be any one of the wheel motors), and closes its contacts to energize relay 59.

Under the dynamic braking condition, the current through the series fields of the wheel motors is reversed while the polarity remains unchanged, and consequently, current flow to pilot relay 323 is blocked by rectifier 319. Thus, the moment the vehicle goes to the dynamic braking condition, pilot relay 323 is de-energized, de-energizing relay 59, opening its contacts to remove the generator paralleling connection. The moment the vehicle goes again to the drive condition, the generators are again automatically paralleled. If desired, of course, several generators could be automatically paralleled for the drive condition and unparalleled for the dynamic braking condition in a similar manner.

Another feature of the present invention is the provision of simple and effective means for automatically applying dynamic braking, the degree of which varies automatically to meet optimum braking requirements. This is accomplished by means of the saturable reactor secondary windings 305, 309 and their effect upon the saturable reactor primary windings 173, 175, which in turn vary the outputs of rectifier bridges 141, 241.

Specifically, under the dynamic braking condition voltage that is developed across the unshunted portion of the series field winding of the left rear wheel motor 17, which voltage varies directly with the wheel motor (acting as a generator) load, is applied to the saturable reactor secondary windings 305, 309. Increased current through windings 305, 309 will result in a decrease in the impedance of the saturable reactor primary windings 173, 175. This in turn will cause bridge rectifier 141 to decrease its output voltage, thus reducing the excitation of the generator exciter shunt field 153, and in turn reducing the excitation of the generator shunt fields 37, which (since generator A and generator B are now operating as motors) will increase their speeds so that they will turn the internal combustion engines 27, 31 faster, thus increasing their loads, which will tend to slow down the wheel motors (now acting as generators). At the same time, the output voltage of rectifier bridge 241 will be increased (since primary winding 177 now has a greater share of the output voltage from source 189). This will result in an increase in the excitation of the motor exciter field which in turn will increase the excitation of the motor shunt fields, which (since they are now operating as generators) will tend to increase their output and decrease their speed. It is pointed out that under the vehicle drive condition, current flow to saturable reactor windings 305, 309 is blocked by rectifier 313.

The arrangement above described whereby shunt field excitation of both the generators and motors is controlled automatically and simultaneously (in the preferred embodiment, via the rectifier bridges 141, 241) to vary the degree of dynamic braking, is another feature of the present invention.

Such arrangement is also utilized in connection with a further feature of the invention which will now be explained. When the vehicle wheel motors exceed a predetermined maximum speed, the over-speed relay 227 closes its contacts 225 to apply voltage from the source 189 via the second transformer 213 to the rectifier bridge 191, the output of which is applied to the saturable reactor secondary windings 201, 197. This results in a further decrease in the impedance of the saturable reactor primary windings 173, 175, which in turn causes a further decrease in the output of rectifier bridge 141 and a further increase in the output of rectifier bridge 241, thus effecting additional dynamic braking effort in the same fashion as was hereinbefore explained. This additional dynamic braking is important because it prevents the wheel motors from exceeding the predetermined maximum safe operating speed. In addition, the increase of motor shunt field excitation as a function of motor speed and also the further increase of same when motor speed exceeds a predetermined maximum are important because in the region of maximum motor speed, the motor series fields are relatively strong while (but for the added excitation) the motor shunt fields would be relatively weak. Since under the dynamic braking condition, the motor series and shunt fields are in bucking relation, this situation (but for the added shunt field excitation) could result in a complete loss of the motor shunt field excitation and motor flashing, with consequent serious damage. It should be understood that the terms "increase" and "decrease" used herein with reference to field excitation, do not necessarily refer to total excitation, but rather "addition to" or "subtraction from" total excitation, which may under some conditions, due to other variables, not actually effect an "increase" or "decrease" in total generator or wheel motor excitation.

Still further dynamic braking effort is provided by utilization of another feature of my invention. When either of the internal combustion engines 27, 31 exceeds a predetermined rotational speed (preferably a speed slightly over the engine governed speed), a respective over-speed relay 353, 357 closes its contacts to energize pilot relay 343 which in turn energizes relay 331 to connect the high capacity resistance grids 327, 329 across the output terminals of the respective generators A and B, and thus the input terminals of the respective wheel motor groups. Since under the over-speed condition each generator is always acting as a motor, and each motor as a generator, the resistance grids will act to absorb some of the power being generated by the respective motor groups (acting as generators), which in turn decreases the amount of power that must be absorbed by the respective generators (acting as motors) so that their speeds are decreased. It should be noticed that the resistances of the grids 327, 329 are connected in series across the contacts of the relay 59 and thus in shunt with same. This means that when these contacts are open, as they are under the dynamic braking condition, there is still a conductive connection between generator B and the main line bus 49. This conductive connection is useful because it permits some simplification of the vehicle control system (e.g., only a single set of contacts is needed to connect the grids 327, 329 across the respective generators for their generator over-speed dynamic braking function), and enhances the operation of the contacts of relay 59 without disturbing the stability of the generators under the dynamic braking condition.

It should be noted that the saturable reactors are preferably arranged as shown, so that their secondary windings work in pairs that are connected in series opposition, so that the effects of any induced voltages as well as alternating currents due to primary impedance changes, are canceled out; however, only one saturable reactor may be used, if desired. Also, if desired, the transformers 272 and 179 may be combined, with the primary winding of the single transformer being connected in the same manner as is shown for primary winding 177.

It will be understood that the showings of specific switches, relays, rectifiers, controllers, direct current voltage sources and the like are schematic only, and may be modified in various ways as will be apparent to those skilled in the art, without departing from the principles of the invention. Thus, the foregoing disclosure and the showings made in the drawings are merely illustrative of the principles of my invention and are not to be interrupted in a limiting sense.

I claim:

1. A dynamic braking system for an electrically powered self-propelled vehicle comprising in combination:
   (a) an internal combustion engine;
   (b) a direct current generator having a shunt field;
   (c) first means for supplying excitation to said generator shunt field;
   (d) second means mechanically coupling said generator to said engine;
   (e) a plurality of direct current electric wheel motors each having a shunt field and a series field;
   (f) third means for connecting output terminals of said generator to input terminals of said wheel motors;
   (g) fourth means for supplying excitation to said motor shunt fields;
   (h) fifth means for deriving signals from a wheel motor series field which vary as a direct function of wheel motor load;
   (i) sixth means utilizing said signals derived by said fifth means to simultaneously produce first output signals which decrease as a direct function of wheel motor load and second output signals which increase as a direct function of wheel motor load;
   (j) seventh means supplying said signals derived by said fifth means to said sixth means under the dynamic braking condition only;
   (k) eighth means for supplying said first output signals of said sixth means to said generator excitation means and said second output signals to said motor shunt field excitation means.

2. The invention as defined by claim 1, wherein said sixth means includes a source of regulated alternating current voltage, a saturable reactor having a first primary winding connected to receive signals from said series field of one of said wheel motors, a second primary winding connected to transmit signals to said generator exciter means, and a secondary winding connected in series with the primary winding of a transformer to said regulated voltage source, said transformer having a secondary winding connected to transmit signals to said motor exciter means.

3. The invention as defined by claim 2, wherein there is additionally provided a third primary winding for said saturable reactor, a direct current voltage source having output terminals connected in series with said third primary winding, an overspeed relay mechanically coupled to a wheel motor to be actuated when the wheel motor exceeds a predetermined speed, with said relay connected to energize said last mentioned voltage source when actuated, to effect further decrease of said first output signals and increase of said second output signals.

4. A dynamic braking system for an electrically powered self-propelled vehicle comprising in combination:
   (a) an internal combustion engine;
   (b) a direct current generator having a shunt field;
   (c) first means for supplying excitation to said generator shunt field;
   (d) second means mechanically coupling said generator to said engine;

(e) a plurality of direct current electric wheel motors each having a series field;
(f) third means for connecting output terminals of said generator to input terminals of said wheel motors;
(g) fourth means for deriving signals from a wheel motor series field which vary as a direct function of wheel motor load;
(h) fifth means utilizing said signals derived by said fourth means to produce output signals which decrease as a direct function of wheel motor load;
(i) sixth means supplying said signals derived by said fourth means to said fifth means under the dynamic braking condition only;
(j) seventh means for supplying said output signals of said fifth means to said generator excitation means.

5. The invention as defined by claim 4, wherein said fifth means includes a source of regulated alternating current voltage, a saturable reactor having a first primary winding connected to receive signals from said series field of one of said wheel motors, a second primary winding connected to transmit signals to said generator exciter means, and a secondary winding connected to said regulated voltage source.

6. A dynamic braking system for an electrically powered self-propelled vehicle comprising in combination:
(a) an internal combustion engine;
(b) a direct current generator;
(c) first means mechanically coupling said generator to said engine;
(d) a plurality of direct current electric wheel motors each having a shunt field and a series field;
(e) third means for connecting output terminals of said generator to input terminals of said wheel motors;
(f) fourth means for supplying excitation to said motor shunt fields;
(g) fifth means for deriving signals from a wheel motor series field which vary as a direct function of wheel motor load;
(h) sixth means utilizing said signals derived by said fifth means to produce output signals which increase as a direct function of wheel motor load;
(i) seventh means supplying said signals derived by said fifth means to said sixth means under the dynamic braking condition only;
(j) eighth means for supplying said output signals of said means.

7. The invention as defined by claim 6, wherein said sixth means includes a source of regulated alternating current voltage, a saturable reactor having a primary winding connected to receive signals from said series field of one of said wheel motors and a secondary winding connected in series with the primary winding of a transformer to said regulated voltage source, said transformer having a secondary winding connected to transmit signals to said motor exciter means.

8. A dynamic braking system for an electrically powered self-propelled vehicle comprising in combination:
(a) an internal combustion engine;
(b) a direct current generator having a shunt field;
(c) first means for supplying excitation to said generator shunt field;
(d) second means mechanically coupling said generator to said engine;
(e) a plurality of direct current electric wheel motors each having a shunt field and a series field;
(f) third means for connecting output terminals of said generator to input terminals of said wheel motors;
(g) fourth means for supplying excitation to said motor shunt fields;
(h) fifth means for deriving signals in response to wheel motor speed in excess of a predetermined speed;
(i) sixth means utilizing said signals derived by said fifth means to simultaneously produce first output signals which decrease as a direct function of wheel motor load and second output signals which increase as a direct function of wheel motor load;
(j) seventh means supplying said signals derived by said fifth means to said sixth means;
(k) eighth means for supplying said first output signals of said sixth means to said generator excitation means and said second output signals to said motor shunt field excitation means.

9. The invention defined by claim 8, wherein said sixth means includes a source of regulated alternating current voltage, a saturable reactor having a first primary winding connected to receive the signals derived by said fifth means, a second primary winding connected to transmit signals to said generator exciter means, and a secondary winding connected in series with the primary winding of a transformer to said regulated voltage source, said transformer having a secondary winding connected to transmit signals to said motor exciter means.

10. A control system for an electrically powered self-propelled vehicle comprising in combination:
(a) a plurality of differential compound direct current generators each having output terminals;
(b) a plurality of internal combustion engines;
(c) means mechanically coupling said engines to respective ones of said generators;
(d) a plurality of electric wheel motors of the direct current cumulative compound type;
(e) means connecting one or more of said wheel motors in parallel with the output terminals of each said generator;
(f) first and second main line bus conductors;
(g) first means connecting at all times a corresponding first output terminal of each said generator to one of said bus conductors;
(h) second means connecting a corresponding second output terminal of each said generator simultaneously to the other of said bus conductors only when said wheel motors are in the driving condition;
(i) said second means including a set of relay contacts serially interposed in the respective connection between each said generator except one, and said other bus conductor;
(j) a plurality of resistance grids;
(k) means at all times connecting at least one of said resistance grids in shunt with each set of said serially interposed relay contacts; and
(l) means connecting one or more of said resistance grids in parallel with the output terminals of each respective generator when any one of said generators exceeds a predetermined respective speed.

11. The invention as defined by claim 10, but wherein said generators are shunt generators.

12. A control system for an electrically powered self-propelled vehicle comprising in combination:
(a) a plurality of differential compound direct current generators each having output terminals;
(b) a plurality of internal combustion engines;
(c) means mechanically coupling said engines to respective ones of said generator;
(d) a plurality of electric wheel motors of the direct current cumulative compound type;
(e) means connecting one or more of said wheel motors in parallel with the output terminals of each said generator;
(f) contactor means having contact terminals and energizing means;
(g) means connecting said contact terminals to said generators so that said generators are connected in parallel when said contactor is energized;
(h) means for deriving signals responsive to the wheel motor drive condition;
(i) means for applying said last mentioned signals to said contactor energizing means;
(j) whereby said generators will be automatically connected in parallel when said wheel motors are in the driving condition and disconnected from parallel when said wheel motors are in the dynamic braking condition.

13. The invention as defined by claim 12, wherein said means for deriving signals responsive to the wheel motor drive condition utilizes signals derived from a wheel motor series field.

14. The invention as defined by claim 12, but wherein said generators are shunt generators.

15. The invention as defined by claim 13, but wherein said generators are shunt generators.

References Cited

UNITED STATES PATENTS

| | | |
|---|---|---|
| 2,370,078 | 2/1945 | Schaelchlin et al. _ 318—149 XR |
| 3,102,219 | 8/1963 | LeTourneau _____ 318—145 |

ORIS L. RADER, *Primary Examiner.*

K. L. CROSSON, *Assistant Examiner.*

U.S. Cl. X.R.

318—154